United States Patent
Wampler et al.

(10) Patent No.: US 7,974,732 B2
(45) Date of Patent: Jul. 5, 2011

(54) RECONFIGURABLE NUMERICAL CONTROL FOR MULTI LEVEL MODULAR MACHINE

(75) Inventors: Robert R. Wampler, Augusta, KS (US); Muhammad Zia Ullah, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 610 days.

(21) Appl. No.: 12/110,897

(22) Filed: Apr. 28, 2008

(65) Prior Publication Data

US 2009/0271016 A1    Oct. 29, 2009

(51) Int. Cl.
G06F 19/00 (2006.01)
B23Q 3/155 (2006.01)
B23B 31/117 (2006.01)

(52) U.S. Cl. ........ 700/179; 700/159; 700/180; 700/186; 700/187; 700/96; 483/1; 483/31; 483/51; 408/226

(58) Field of Classification Search .................. 700/96
See application file for complete search history.

(56) References Cited

U.S. PATENT DOCUMENTS

| | | | | |
|---|---|---|---|---|
| 4,631,465 A * | 12/1986 | Fukuyama et al. | ........... | 318/565 |
| 5,465,215 A * | 11/1995 | Strickland et al. | ........... | 700/180 |
| 5,848,458 A * | 12/1998 | Bullen | ........... | 29/33 K |
| 6,349,237 B1 * | 2/2002 | Koren et al. | ........... | 700/96 |
| 6,350,222 B2 * | 2/2002 | Susnjara | ........... | 483/1 |
| 6,604,015 B2 * | 8/2003 | Iriguchi et al. | ........... | 700/187 |
| 6,752,750 B2 * | 6/2004 | Adachi et al. | ........... | 483/31 |
| 7,490,710 B1 * | 2/2009 | Weskamp et al. | ........... | 198/345.3 |
| 2006/0159533 A1 * | 7/2006 | Zeiler et al. | ........... | 408/226 |
| 2006/0242818 A1 * | 11/2006 | Penick et al. | ........... | 29/560 |
| 2008/0091296 A1 * | 4/2008 | Zacek et al. | ........... | 700/186 |
| 2009/0143207 A1 * | 6/2009 | Wampler et al. | ........... | 483/51 |

* cited by examiner

Primary Examiner — Albert Decady
Assistant Examiner — Sunray R Chang
(74) Attorney, Agent, or Firm — Hovey Williams LLP (57) ABSTRACT

A control system for a modular reconfigurable numerically controlled machine comprising at least one memory storage device associated with each of a plurality of detachable modular components to store kinematic and connection information about the modular component. The information in the memory storage devices is read and processed by a main processing unit when the modular component is attached to a primary structure of the numerically controlled machine. The control system further comprises a plurality of component actuators, which receive control signals from the main processing unit, to actuate the modular components attached to the numerically controlled machine. A hardware component connector may provide at least one of a physical, electrical, communications, and pneumatic connection between the primary structure of the numerically controlled machine and the modular components.

8 Claims, 6 Drawing Sheets

RECONFIGURABLE NUMERICAL CONTROL FOR MULTI LEVEL MODULAR MACHINE

BACKGROUND

1. Field

The present invention relates to numerically controlled (NC) machines used in fields such as milling and manufacturing of structural and aerodynamic aircraft parts.

2. Related Art

Numerically controlled (NC) machines are used in a variety of manufacturing processes, including milling and automatic fiber placement (AFP) for manufacturing composite or metal parts for aircrafts and the like.

NC machines are traditionally custom designed for a specific task and contain a fixed number of structural components in a fixed configuration. Once the NC machine is built with a particular configuration, it can not have primary structural components, such as a movable beam supporting a material placement head, added or removed without retooling and reprogramming the machine, which can be a complicated and expensive process. As such, different machines are typically required for different manufacturing processes. At a manufacturing plant where multiple manufacturing processes are regularly carried out, using a different NC machine for each manufacturing process or each part to be tooled can be expensive.

Accordingly, there is a need for an improved NC machine that does not suffer from the problems and limitations of the prior art.

SUMMARY

The present invention is a control system for a modular, reconfigurable numerically controlled (NC) machine having detachable components for supporting and actuating at least one of a plurality of modular components and head assemblies, thereby allowing for multiple configurations so that a variety of manufacturing processes may be performed or a variety of parts may be machined on a single piece of equipment.

In various embodiments of the invention, the control system comprises a plurality of memory storage devices, with at least one memory storage device in each of the detachable modular components and head assemblies; and a main processing unit to read data from at least one of the memory storage devices to determine which modular components are attached to the numerically controlled machine and what type of movements each attached component may perform.

Each memory storage device may contain information on the type of the modular component, the movements that the modular component may perform, and location and vector information. The types of movement stored in each memory storage device may be at least one of linear motion, curved motion, rotary motion, and tilting motion. The location and vector information may comprise mount point information regarding a location on the modular component where the modular component may attach to the NC machine or another component and connect point information regarding a location on the modular component where another subsequent modular component may be attached to the currently-attached modular component.

In various embodiments of the invention, each memory storage device may contain information regarding the modular component's travel limits, how fine of an increment the modular component may move, the maximum and minimum acceleration of the modular component, compensation values, and kinematic definitions.

In one embodiment of the invention, the control system may control a reconfigurable NC machine comprising: at least one base beam; a horizontal beam supported by the base beam and movable along a first axis and a second axis relative to the base beam; a connecting assembly attachable to the horizontal beam and movable along a third axis which is different from the first and second axes; at least one detachable modular component movably attached to the connecting assembly; and at least one detachable head assembly movably attachable to at least one of the connecting assembly and the modular component. The modular component may have a linear, concave, or convex shape or surface. Multiple head assemblies may be attached to the modular component and may be movable relative to the modular component.

The reconfigurable NC machine may further comprise a plurality of component actuators contained in the modular components to receive control signals from the main processing unit, and a hardware component connector for providing at least one of a physical, electrical, communications, and pneumatic connection between the NC machine and the attached modular components and head assemblies.

These and other important aspects of the present invention are described more fully in the detailed description below.

BRIEF DESCRIPTION OF THE DRAWINGS

An embodiment of the present invention is described in detail below with reference to the attached drawing figures, wherein.

DETAILED DESCRIPTION

Figure 1:
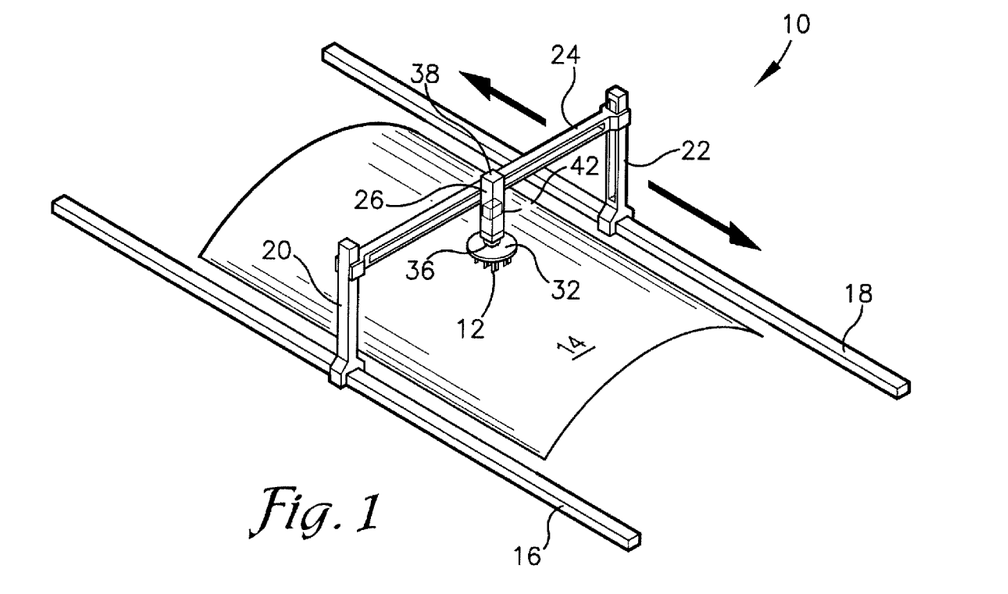
FIG. 1 is a perspective view of the reconfigurable system according to one embodiment of the present invention and shown interacting with a mold surface.

FIG. 1 illustrates a reconfigurable system 10 constructed in accordance with an embodiment of the present invention. The reconfigurable system 10 may be assembled in a plurality of configurations to be used for a variety of manufacturing processes, and is particularly suited for dispensing and compacting portions of a material 12 onto a mold surface 14, such as automatic fiber placement (AFP) onto a mandrel surface for manufacturing composite parts for aircrafts and the like. The reconfigurable system 10 may be a type of numerically controlled (NC) machine with a plurality of detachable and attachable structural components.

Referring to FIG. 1, an embodiment of the reconfigurable system 10 may comprise: a first and a second base beam 16,18; a first and a second upwardly extending beam 20,22 movably attached to the first and the second base beam 16,18; a horizontal beam 24 movably attached to the first and the second upwardly extending beam 20,22; a connecting assembly 26 movably attached to the horizontal beam 24; and at least one of a plurality of detachable modular components 28,30,32,34 movably attachable to at least one of the beams and the connecting assembly 26. At least some of the detachable modular components 28-34 may be detachable head assemblies 32,34 movably attachable to at least one of the connecting assembly 26 and the other modular components 28,30.

Figure 2:
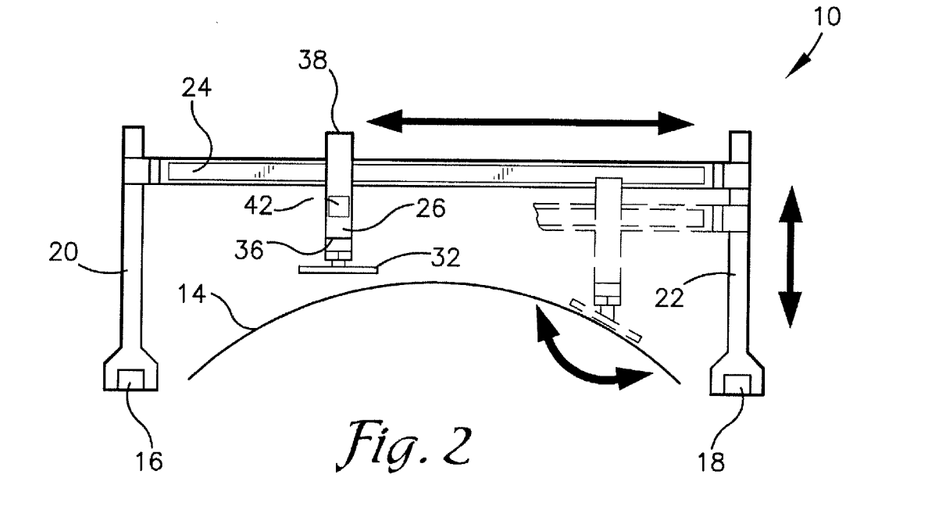
FIG. 2 is a front plan view of the reconfigurable system of FIG. 1, illustrating the movement of a connecting assembly, horizontal beam, and head assembly.

In one embodiment of the invention, the beams 16-24 form a gantry structure with the first base beam 16 parallel to the second base beam 18, the first upwardly extending beam 20 perpendicular to the first base beam 16, the second upwardly extending beam 22 perpendicular to the second base beam 18, and the horizontal beam 24 extending from the first upwardly extending beam 20 to the second upwardly extending beam 22. The first and second upwardly extending beams 20,22 may be movably attached to the first and second base beams 16,18, and the horizontal beam 24 may be movably attached to the first and second upwardly extending beams 20,22, as illustrated in FIGS. 1-2. Means for movably attaching the beams may be any means known in the art for slidably attaching one object to another, including tracks, rollers, and bearing ways.

Figure 8:
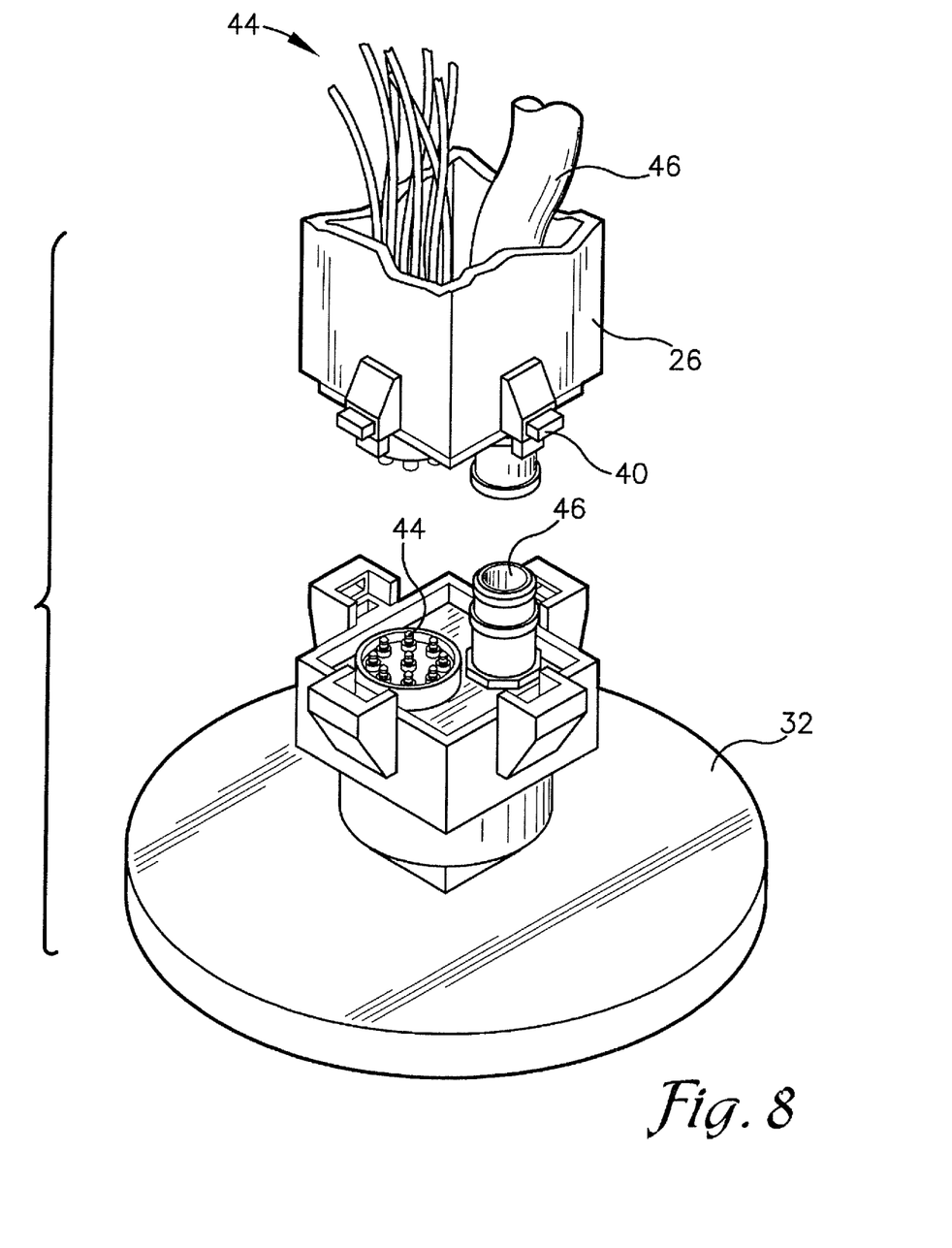
FIG. 8 is a fractured close-up perspective view of the connecting assembly and head assembly of FIG. 2.

Referring to FIGS. 3-7, in various embodiments, the connecting assembly 26 may be movably attached to the horizontal beam 24 and may have a first end 36 and a second end 38. The connecting assembly 26 may comprise a hardware component connector 40 at its first end 36, as illustrated in FIG. 8, for attaching and detaching at least one of the modular components 28,30 or one of the head assemblies 32,34. The hardware component connector 40 may be any type of connection apparatus known in the art for simultaneously making one or more of a physical, electrical, communications, and pneumatic connection between components. For example, appropriate male/female connections known in the art may be used to make any of physical, electrical, communications, and pneumatic connections, as illustrated in FIG. 8.

The modular components 28,30 may be curved in shape, including a concave modular component 28 and a convex modular component 30. The concave modular component 28 may be elongated and curved in a substantially concave shape relative to the mold surface 14. The convex modular component 30 may be elongated and curved in a substantially convex shape relative to the mold surface 14. Both the concave and convex modular components 28,30 are movably attachable to the connecting assembly 26. Alternatively, a single curved modular component may be movably attachable to the reconfigurable system 10 in a concave position, so that it curves toward the mold surface 14, or a convex position, so that it curves away from the mold surface 14. Other modular components 28,30 of various shapes and sizes may be at least one of slidably, rotatably, and pivotally attached to the reconfigurable system 10 as required by a given application. For example, in an alternative embodiment of the invention, at least one of the modular components 28,30 may be elongated linear components that are not curved in shape (not shown). Each of the connecting assembly 26 and the detachable modular components 28,30 may additionally comprise means known in the art for slidably attaching one object to another, including tracks, rollers, and bearing ways.

The head assemblies 32,34 may be any head assembly known in the art, including material placement heads such as an AFP application head, cutter spindles, or probes. Different types of head assemblies may be interchangeably used on the reconfigurable system 10, thereby allowing a single system, such as a single NC machine, to machine a variety of parts or perform a variety of manufacturing processes. At least one head assembly 32,34 may movably attach to at least one of the connecting assembly 24, the concave modular component 28, and the convex modular component 30.

Figures 4, 5:
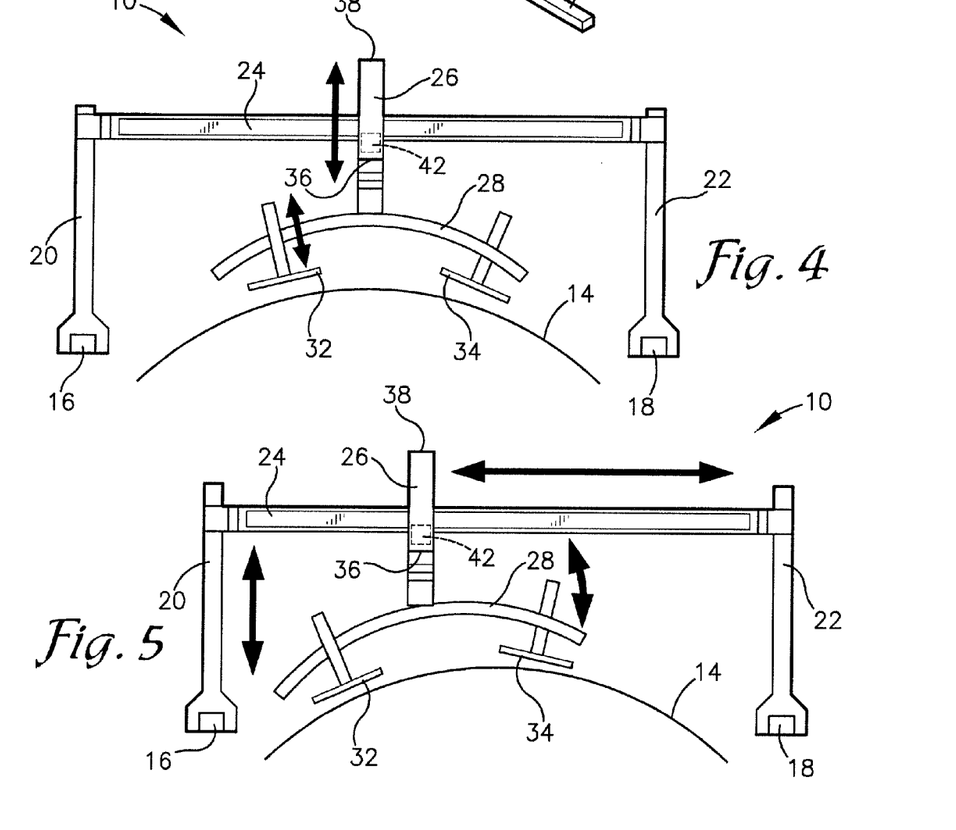
FIG. 4 is a front plan view of the reconfigurable system of FIG. 3.
FIG. 5 is a front plan view of the reconfigurable system of FIG. 3 and illustrating the movement of the concave modular component.
Figure 6:
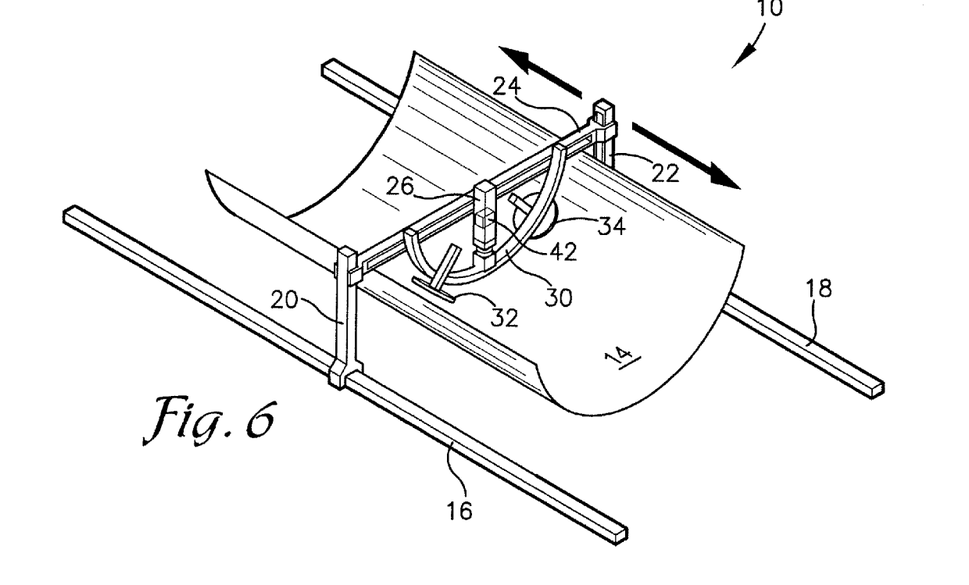
FIG. 6 is a perspective view of the reconfigurable system of FIG. 1 interacting with another mold surface and reconfigured with a convex modular component supporting two head assemblies.
Figure 7:
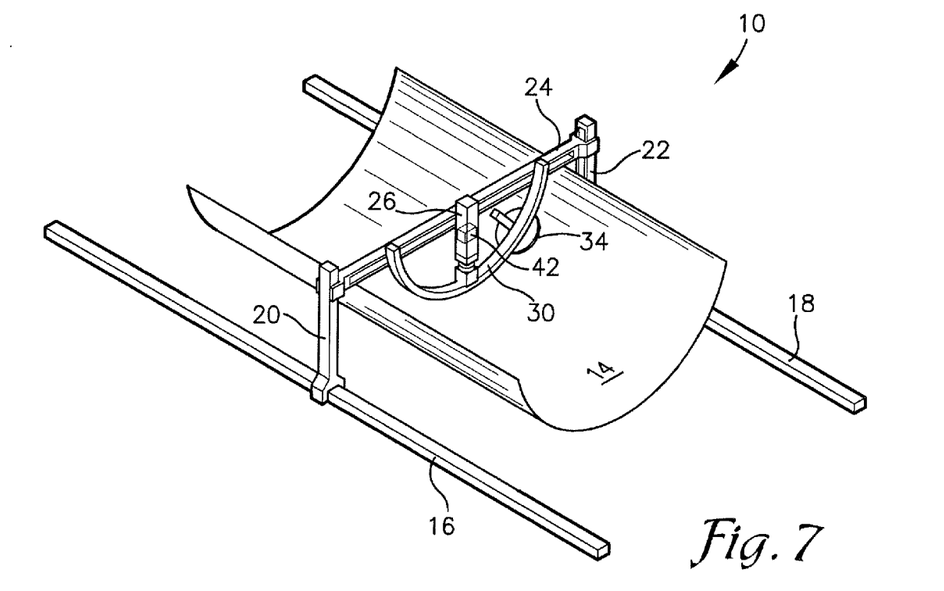
FIG. 7 is a perspective view of the reconfigurable system of FIG. 6 reconfigured with only one head assembly supported by the convex modular component.

The beams 16-24, connecting assembly 26, modular components 28,30, and head assemblies 32,34 may further comprise actuators known in the art, such as drive motors, for moving each component relative to each other. For example, an actuator 42 in the connecting assembly 26 may actuate the concave modular component 28 to pivot, as illustrated in FIG. 5. The actuator 42 may also actuate the convex modular component 30 or one of the head assemblies 32,34 to rotate in at least one plane when attached to the connecting assembly 26. The beams, connecting assembly 26, and modular components 28,30 may also comprise wires 44 for carrying electrical and communication signals and pneumatic or hydraulic tubes 46 to carry fluid for actuating the connecting assembly 26 and each modular component 28,30. Additionally, each component of the reconfigurable system 10 may comprise programmable logic control (PLC) and EPROM/memory storage devices, as described in more detail below.

In various embodiments, each beam of the reconfigurable system 10 may move relative to another beam. The upwardly extending beams 20,22 may move along a first axis relative to the base beams 16,18, as illustrated in FIG. 1. The horizontal beam 24 may move along the first axis relative to the base beams 16,18 and along a second axis relative to the base beams 16,18 and the upwardly extending beams 20,22, as illustrated in FIGS. 1-2. Additionally, the connecting assembly 26 may be movably attached to the horizontal beam 24 and may move along a third axis perpendicular to the first and second axes, as illustrated in FIG. 2. The third axis runs along the length of the horizontal beam 24. The connecting assembly 26 may also move perpendicularly relative to the third axis, as illustrated in FIG. 4.

The modular components 28,30 and the head assemblies 32,34 may be at least one of interchangeably and cooperatively attached to the horizontal beam 24 by the connecting assembly 26. For example, one of the head assemblies 32,34 may be attached directly to the connecting assembly 26 or attached to the modular component 28, which may be attached to the connecting assembly.

Figure 3:
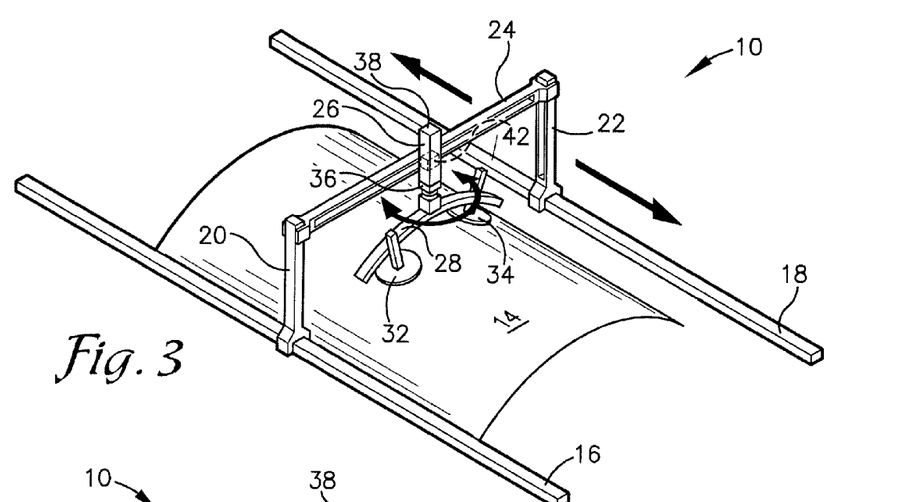
FIG. 3 is a perspective view of the reconfigurable system of FIG. 1 shown interacting with the mold surface and reconfigured with a concave modular component supporting two head assemblies.

The first end 36 of the connecting assembly 26 may be at least one of slidably, rotatably, and pivotally attached to one of the modular components 28,30 and one of the head assemblies 32,34. Specifically, the modular component 28 may rotate in at least one plane when attached to the connecting assembly 26, and the modular component 30 may rotate in at least one plane when attached to the connecting assembly 26, as illustrated in FIG. 3 and FIG. 5. Additionally, at least one of the head assemblies 32,34 may rotate in at least one plane when attached to the connecting assembly 26. When attached to the modular components 28,30, the head assemblies 32,34 may move perpendicularly relative to the curve of the concave or convex modular components 28,30, as illustrated in FIG. 4. The head assemblies 32,34 may also move along the length of the concave and convex modular components 28,30 when attached to one of the modular components 28,30.

A method for reconfiguring the reconfigurable system 10 may comprise attaching a first component, such as the concave modular component 28, the convex modular component 30, or one of the head assemblies 32,34, to the connecting assembly 26. The method may further comprise detaching the first component from the connecting assembly 26 and attaching a second component, such as the concave modular component 28, the convex modular component 30, or one of the head assemblies 32,34, to the connecting assembly 26. The second component may be a different component than the first component.

In one embodiment of the invention, the method may comprise attaching one of the modular components 28,30 to the connecting assembly 26. The method may further comprise attaching both of the head assemblies 32,34 to opposing sides of the modular component 28,30 that is attached to the connecting assembly 26. Additionally, the method may comprise detaching head assembly 34 from the modular component 28,30 that is attached to the connecting assembly 26, resulting in, for example, the configuration illustrated in FIG. 7.

Although the structural components of the invention have been described with reference to the embodiments illustrated in the attached drawings, it is noted that equivalents may be employed and substitutions made herein without departing from the scope of the invention as recited in the claims. Particularly, it is noted that beams and other components may be omitted without departing from the scope of the invention as recited in the claims. For example, the reconfigurable system 10 may simply comprise the first base beam 16 supporting the horizontal beam 24, which may be movable relative to the first base beam 16; the connecting assembly 26 movably attached to the horizontal beam; and at least one detachable modular component 28,30 movably attachable to at least one of the beams.

The illustrations of the modular components 28-34 are only examples of the types of components that may be used with the reconfigurable system 10. The modular components 28-34 may be any of concave, convex, or linear components, head assemblies, tools, probes, and any type of component that may be mechanically actuated and connected to an NC machine. Furthermore, the beams 16-24 and the connecting assembly 26 as described above may be generally referenced herein as a primary structure 48 of the NC machine. The primary structure 48 generally refers to the components of the reconfigurable system which are not modular or attachable and detachable.

Figure 9:
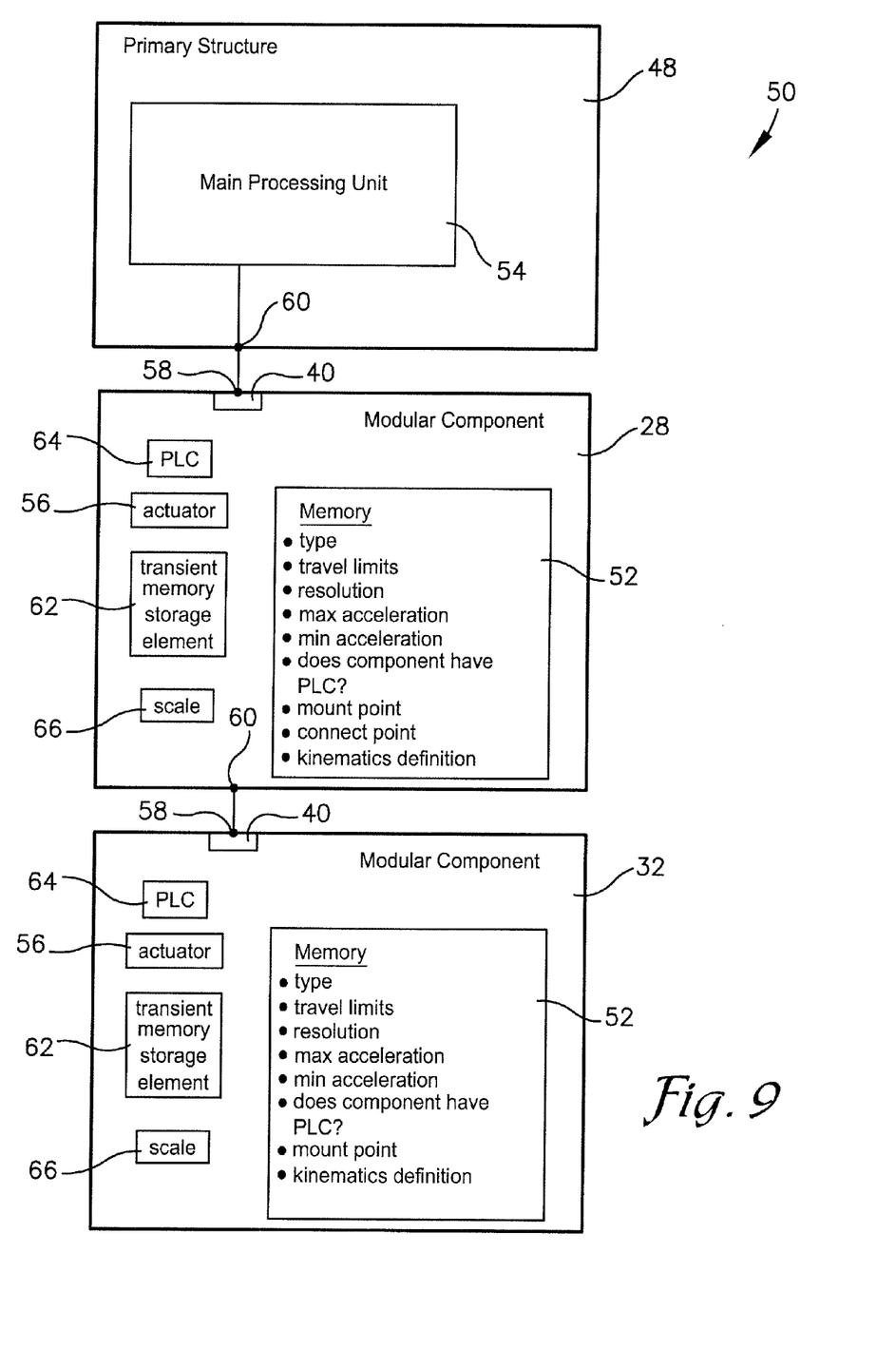
FIG. 9 is a flow chart of the control system for the reconfigurable system of FIG. 1, including a main processing unit and modular components.

FIG. 9 illustrates a control system 50 constructed in accordance with an embodiment of the present invention. The control system 50 may be used to control the reconfigurable system 10, and is particularly suited for controlling a reconfigurable numerically controlled (NC) machine, such as the reconfigurable system described above and in related U.S. patent application Ser. No. 11/947,488. U.S. patent application Ser. No. 11/947,488 is incorporated by reference herein in its entirety. The control system 50 processes movement and configuration information about at least one of the modular components 28-34.

In various embodiments, the control system 50 comprises a plurality of memory storage devices 52 with at least one memory storage device contained in each of the detachable modular components 28-34 to store kinematic and connection information about the memory storage device's modular component, and a main processing unit 54 to read and process data from at least one of the memory storage devices 52. The main processing unit 54 may also send control signals to a plurality of component actuators 56, such as drive motors or any actuators known in the art, to actuate the modular components 28-34.

Each memory storage device 52 may contain data or information about the type of the modular component and the movements the component may perform, as illustrated with modular components 28,32 in FIG. 9. For example, the memory storage device 52 may contain information that the modular component 28 is a linear modular component or a curved modular component. Additionally, the memory storage device 52 may contain information that the modular component 28 is a rotary modular component with greater than 270-degrees of movement, a tilting modular component with less than 270-degrees of movement, or a cutter spindle, probe or automatic fiber placement (AFP) application head with other unique functions.

The types of the modular components 28-32 may be defined in their memory storage devices 52 by their functionality or motion as well as the sequence in which they will perform that function. For example, the types of movement stored in each memory storage device 52 may be linear motion, curved motion, rotary motion, and tilting motion. So, for example, one type of modular component may provide a rotary then a linear motion, while another component may only provide a linear motion. Other types of movement may be defined and stored in each of the memory storage devices 52 as well. For example, a special case may be defined for AFP tape application heads or other tools or probes which must perform a function other than simple movement. For example, an AFP tape application head may need to cut the tape at some point.

In various embodiments of the invention, the memory storage device 52 may also contain location and vector information, such as the coordinates of a mount point 58, which is a location on each of the modular components 28-34 where the modular component may attach to the primary structure 48 or to another modular component which is already attached to the primary structure 48. The location and vector information may also include the coordinates of a connect point 60, which is a location on at least some of the modular components 28-34 where another modular component may be attached. For example, one of the memory storage devices 52 of one of the modular components 28-34 may store mount point coordinate $x_1, y_1, z_1, i_1, j_1, k_1$ and connect point coordinate $x_2, y_2, z_2, i_2, j_2, k_2$. The mount point 58 and the connect point 60 coordinates stored in the memory storage devices 52 may be local coordinates which are coordinates that are relative to each individual modular component 28-34 in a parked position.

When the modular components 28-34 are not connected to the primary structure 48, they may be stored in one of a plurality of parked positions (not shown), wherein each modular component 28-34 has its own unique parked position. The coordinates of the parked position of each modular component 28-34 may be stored in its memory storage device 52 and/or in the main processing unit 54. The local coordinates of the modular components 28-34 are translated into global coordinates by the main processing unit 54 once the modular components 28-34 are connected to the primary structure 48 either directly or indirectly through another modular component. Global coordinates are coordinates relative to the primary structure 48.

Some of the modular components 28-34 may have more than one connect point 60 to allow multiple modular components 28-34 to be attached. A component that cannot have another modular component attached to it, such as a head assembly or a probe, may not have a connect point 60 or any connect point coordinates stored on its memory storage device 52 and is sometimes referred to as a terminator-type modular component.

The primary structure 48 may also have at least one connect point 60, such that the mount point 58 of one modular component 28 will be connected at one of the connect points 60 of the primary structure 48. For example, one of the connect points 60 of the primary structure 48 may be located on the connecting assembly 26. Then the connect point 60 of the modular component 28 may attach to the mount point 60 of the next modular component 32 to be attached, as illustrated if FIG. 9.

So, for example, using the global coordinates of one of the connect points 60 of the primary structure 48, the mount point 58 and connect point 60 local coordinates stored in the memory storage devices 52 of any of the modular components 28-34 that are attached to the primary structure 48, such as modular components 28,32 illustrated in FIG. 9, and data stored on the order and configuration in which these devices are connected to each other, the main processing unit 54 can compute the global coordinates of these mount points 58 and connect points 60.

In various embodiments of the invention, each memory storage device 52 may contain information regarding the modular component's travel limits, the resolution or size of an increment the modular component may move, the maximum and minimum acceleration of the modular component, compensation values, whether or not the component has programmable logic controls (PLC), and kinematics definitions. Kinematics definitions may include information such as the distance of the one of the modular components 28-34 to the beams 16-24 of the primary structure 48 or to other points on the primary structure 48 when the modular component is in its parked position.

In one embodiment of the invention, in addition to the memory storage device 52, the modular components 28-34 may further comprise a transient memory storage element 62, such as a type of storage register, for storing a current or real-time global coordinates of the connect point 60 for the modular component. However, the transient memory storage element 62 may be used to store other real-time kinematic and configuration data as required by a give application.

The modular components 28-34 may further comprise programmable logic control (PLC) 64 for managing a plurality of functions, such as managing coolant flow and other lower-level functions, as known in the art. At least one of the modular components 28-34 may also comprise a scale 66, defined herein as a movement measuring device, such as a sensor or magnetic strip, for measuring the linear motion of the component and relaying this data to the main processing unit 54 to be used for various control computations.

Figure 10:
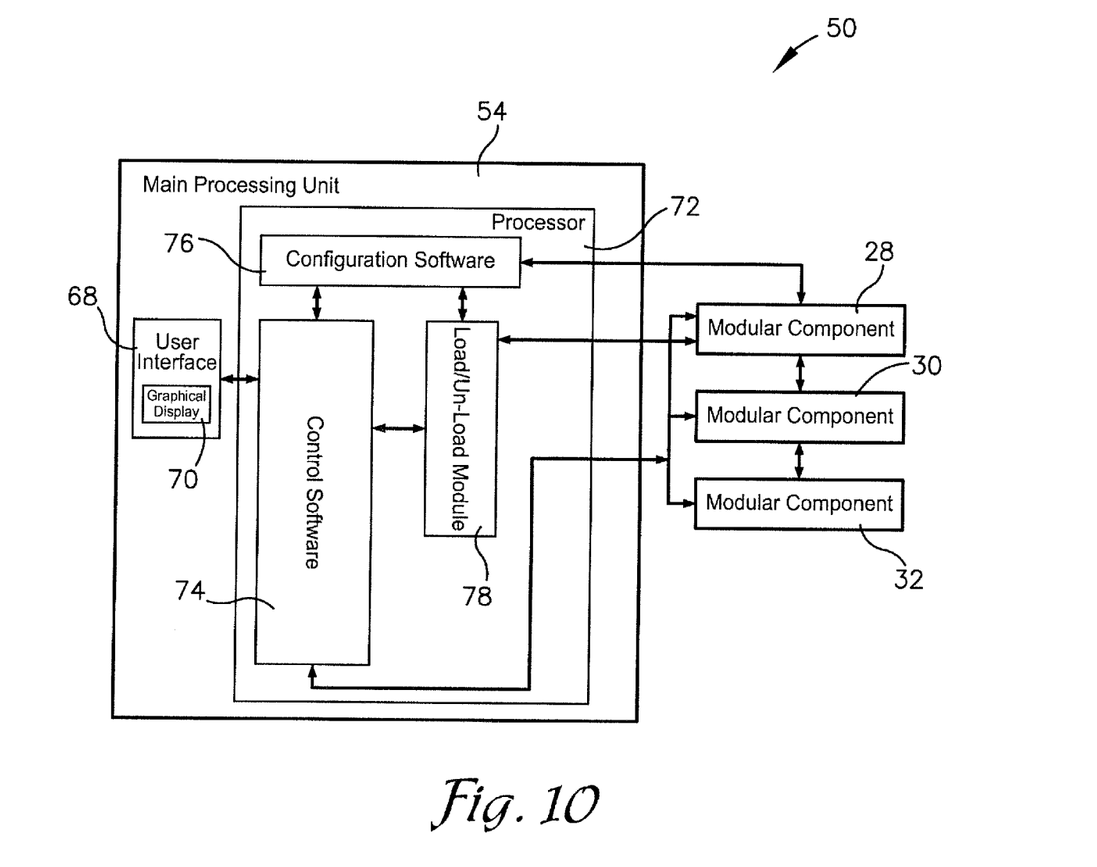
FIG. 10 is a flow chart of the main processing unit of FIG. 9 illustrating the data and/or power exchange between the main processing unit and the modular components.

As illustrated in FIG. 10, the main processing unit 54 may comprise a user interface 68 with a graphical display 70 and a processor 72 for performing physical computing, wherein the processor 72 may contain control software 74, configuration software 76, and a load/unload software module 78.

The user interface 68 may comprise a keyboard, the graphical display 70, and one or more peripheral devices, such as a mouse, scanner, or printer. Other user-operable controls and displays known in the art may also be used to provide the user with information about the reconfigurable system 10 and to allow the user to send commands to the processor 72.

The processor 72 as described herein may be a computer or computer network. The computer may be a part of a computer network, such as the computer network that includes one or more client computers and one or more server computers interconnected via a communications system. The software contained on the processor 72 may also be implemented, in whole or in part, on a wireless communications system including, for example, a network-based wireless transmitter and one or more wireless receiving devices, such as a handheld computing device with wireless communication capabilities. It will be appreciated, however, that the principles of the present invention are useful independently of a particular implementation, and that one or more of the steps described herein may be implemented without the assistance of a computing device.

The present invention can be implemented in hardware, software, firmware, or a combination thereof. In a preferred embodiment, however, the invention is implemented with a combination of software and hardware. The software and hardware described herein are merely examples of a program and equipment that may be used to implement the present invention and may be replaced with other software and hardware equipment without departing from the scope of the present invention.

The software of the present invention, such as the control software 74, the configuration software 76, and the load/unload software module 78, is stored in or on a computer-usable medium, such as a computer-readable medium, residing on or accessible by a host computer for instructing the host computer to implement the method of the present invention as described herein. The host computer may be a server computer or a network client computer. The software preferably comprises an ordered listing of executable instructions for implementing logical functions in the host computer and other computing devices coupled with the host computer. The software can be embodied in any computer-usable medium for use by or in connection with an instruction execution system, apparatus, or device, such as a computer-based system, processor-containing system, or other system that can fetch the instructions from the instruction execution system, apparatus, or device, and execute the instructions.

It will be understood by those skilled in the art that the software may comprise a single list of executable instructions or two or more separate lists, and may be stored on a single computer-usable medium or multiple distinct media. The software may also comprise various code segments, which may include one or more lists, or portions of lists, of executable instructions. Code segments may include overlapping lists of executable instructions, that is, a first code segment may include instruction lists A and B, and a second code segment may include instruction lists B and C.

In the context of this document, a "computer-usable medium" can be any means that can contain, store, communicate, propagate or transport the program for use by or in connection with the instruction execution system, apparatus, or device. The computer-usable medium can be, for example, but is not limited to, an electronic, magnetic, optical, electromagnetic, infrared, or semi-conductor system, apparatus, device, or propagation medium. More specific, although not inclusive, examples of computer-usable media would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The flow charts of FIGS. 9-10 show the functionality and operation of a preferred implementation of the present invention in more detail. In this regard, some of the blocks of the flow charts may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in reverse order depending upon the functionality involved.

The control software 74 may be one of a variety of NC machine control software, as well known in the art. The control software 74 may command the processor 72 to send signals to actuators in the primary structure 48 for actuating various components of the primary structure 48, such as actuator 42 in the connecting assembly 26 or an actuator for one of the slidable beams 16-24.

In one embodiment of the invention, the configuration software 76 may configure the control software 74 based on the number of modular components 28-34 attached to the primary structure 48 and the operating parameters of each modular component 28-34, which the configuration software 76 may read from the memory storage devices 52 of the attached modular components 28-34. The configuration software 76 may use data from the memory storage devices 52 of the attached modular components 28-34, along with information stored in the processor 72 regarding the current order of connection of the modular components 28-34, to configure the control software 74, such that the control software 74 may control the attached modular components 28-34.

The configuration software 76 also communicates with the load/unload module 78, which may be a software module which stores location information for each of the modular components 28-34. For example, the load/unload module 78 may store information on which and how many of the modular components 28-34 are currently attached to the primary structure 48 and the global coordinates of the parked position of both the attached and unattached modular components 28-34. Then, when the user sends a command to the control software 74 via the user interface 68 to attach an additional modular component, the control software 74 can retrieve the global coordinates of the modular component from the load/unload module 78.

Additionally, the configuration software 76 may process and send the updated global coordinates of the connect point 60 of a newly-attached modular component to the load/unload module 78. For example, the global coordinates of the connect point 60 of the modular component 28 may be sent to the load/unload module 78 when the modular component 28 is attached to the primary structure 48. Then, for example, to connect the modular component 32 to the modular component 28, the control software 74 may retrieve the global coordinates of the connect point 60 of the modular component 28 from the load/unload module 78 as well as the global coordinates of the mount point 58 of the modular component 32 stored in the load/unload module 78. These coordinates may then be used to command at least a portion of the primary structure 48 or the currently attached modular component 28 to move to the appropriate coordinates and attach the mount point 58 of the desired modular component 32 to the connect point 60 of the currently attached modular component 28.

The load/unload module 78 may also verify at least one of the physical, pneumatic, hydraulic, electric, and communication connections of the components as required. For example, the hardware component connector 40 of the modular component 28 may have a plurality of pins or other communication connectors known in the art. One pin of each hardware component connector 40 may be a heartbeat pin (not shown), which sends a signal to the main processing unit 54, specifically to the load/unload module 78, to verify that the modular component 28 is connected. Another pin may be used to provide power to the mount point 58 of the next modular component to be attached, such as modular component 32 as illustrated in FIG. 9.

In various embodiments of the invention, a method of controlling the reconfigurable system 10 using the control system 50 described above may comprise: sending a first actuation signal to actuators 42 of the primary structure 48 to move at least a portion of the primary structure 48 to a first modular component 28; attaching the first modular component 28 to the primary structure 48; verifying that all of the connections between the first modular component 28 and the primary structure 48 have been made; reading kinematic data from the memory storage device 52 of the first modular component 28; converting the local coordinates stored in the memory storage device 52 to global coordinates; and updating the graphical display 70 to display data from the first modular component 28.

The method may further comprise sending a second actuation signal to actuators 40 of the primary structure 48 to move at least a portion of the primary structure 48 and the first modular component 28 to a second modular component 30; attaching the second modular component 30 to the first modular component 28; verifying that all of the connections between the first modular component 28 and the second modular component 30 have been made; reading kinematic data from the memory storage device 52 of the second modular component 30; converting the local coordinates stored in the memory storage device 52 of the second modular component 30 to global coordinates; and updating the graphical display 70 to display data from the second modular component 30.

More specifically, a method of using the control system 50 may comprise a user sending a command through the user interface 68 to the processor 72 to attach the first modular component 28; the control software 74 on the processor 72 retrieving the global coordinates of the mount point 58 of the first modular component 28 in parked position and the connect point 60 of the primary structure 48 from the load/unload module 78; and the control software 74 sending a command signal to one of the actuators 42 of the primary structure 48 to move at least a portion of the primary structure 48 to the first modular component 28 and attach the mount point 58 of the first modular component 28 to the connect point 60 of the primary structure 48. Next, the method may comprise the hardware component connector 40 sending a connection verification signal to the load/unload module 78 of the processor 72 and the load/unload module 78 notifying the configuration software 76 that the first modular component is connected to the primary structure 48.

Once it is verified that the first modular component 28 is attached to the primary structure 48, the configuration software 76 may retrieve kinematic data stored on the memory storage device 52 and the configuration software 76 may reconfigure the control software 74 with the data from the memory storage device 52 of the first modular component 28. The control software 74 may use this data from the first modular component 28 to update the user graphical display 70. Using information from the updated graphical display 70, the user may send a command to the control software 74 via the user interface 68 to actuate the component actuator 56 of the first modular component 28 and the processor 72 may then send an actuation signal to the actuator 56 of the first modular component.

The methods disclosed for attaching the first modular component 28 may be repeated in order to attach and load the second modular component 30 and subsequent modular components as needed. The command signals for loading, unloading, and actuating the modular components 28-34 have been described as being entered by a user through the user interface 68. However, these commands may alternatively be pre-programmed into the processor or may be read from a computer-readable medium.

When a command signal is sent to the control software 74 to unload one of the attached modular components 28-34, the parked position global coordinates of the component may be retrieved from the load/unload module 78. The load/unload module 78 sends a signal to the configuration software 76 to verify that the component is disconnected, and the configuration software 76 may then reconfigure the control software 74. The control software 74 then updates the graphical display 70 so that it no longer displays data related to the modular component that is disconnected.

Although the invention has been described with reference to the embodiments illustrated in the attached drawings, it is noted that equivalents may be employed and substitutions made herein without departing from the scope of the invention as recited in the claims. Particularly, it is noted that other types of information may be stored in on the memory storage devices 52 without departing from the scope of the invention. Additionally, while only four modular components 28-34 are described herein, more or less may be used as required by a particular NC machine or manufacturing process. Also, while various configurations for attaching the modular components are illustrated in FIGS. 1-8, other configurations may be used and the modular components may have any number of connect points required by a given application. Furthermore, the combination of computer code segments operable to implement the present invention may be distributed across a computer network. Copies of the data may be stored in any or all of the computers involved in the distributed process.

The invention claimed is:

1. A method for controlling a modular reconfigurable numerically controlled machine comprising:
    sending a first actuation signal to actuators of a primary structure of the numerically controlled machine to move at least a portion of the primary structure to a first modular component;
    attaching the first modular component to the primary structure;
    verifying that all of the connections between the first modular component and the primary structure have been made;
    processing kinematic data from a memory storage device of the first modular component;
    converting at least one of a plurality of local coordinates stored in the memory storage device to global coordinates;
    updating a graphical display to display data from the first modular component;
    sending a second actuation signal to actuators of the primary structure to move at least a portion of the primary structure and the first modular component to a second modular component;
    attaching the second modular component to the first modular component;
    verifying that all of the connections between the first modular component and the second modular component have been made;
    processing kinematic data from the memory storage device of the second modular component;
    converting the local coordinates stored in the memory storage device of the second modular component to global coordinates; and
    updating the graphical display to display data from the second modular component.

2. The method of claim 1, wherein a user sends a command through a user interface to a processor to attach the first modular component.

3. The method of claim 1, wherein a control software of a processor retrieves the global coordinates of a mount point on the first modular component in an initial unattached position and a connect point on the primary structure from a load/unload software module and sends a command signal to one of the actuators of the primary structure to move at least a portion of the primary structure to the first modular component.

4. The method of claim 3, wherein the mount point of the first modular component is attached to the connect point of the primary structure.

5. The method of claim 3, wherein a hardware component connector sends a connection verification signal to the load/unload software module of the processor and the load/unload module notifies a configuration software implemented in the processor that the first modular component is connected to the primary structure.

6. The method of claim 5, wherein the configuration software may process the kinematic data stored on the memory storage device and may reconfigure the control software with the data from the memory storage device of the first modular component, and the control software may update the graphical display to display data from the first modular component.

7. The method of claim 6, further comprising sending an actuation signal to a drive motor of the first modular component to actuate the first component.

8. The method of claim 3, further comprising unattaching the first modular component at its initial unattached position.

* * * * *